US008712192B2

(12) United States Patent
Thota

(10) Patent No.: US 8,712,192 B2
(45) Date of Patent: Apr. 29, 2014

(54) GEO-CODING IMAGES

(75) Inventor: Chandrasekhar Thota, Redmond, WA (US)

(73) Assignee: Microsoft Corporation, Redmond, WA (US)

(*) Notice: Subject to any disclaimer, the term of this patent is extended or adjusted under 35 U.S.C. 154(b) by 1078 days.

(21) Appl. No.: 11/379,466

(22) Filed: Apr. 20, 2006

(65) Prior Publication Data

US 2007/0258642 A1 Nov. 8, 2007

(51) Int. Cl.
G06K 9/54 (2006.01)
H04N 1/00 (2006.01)
G06F 12/00 (2006.01)
G06F 17/30 (2006.01)

(52) U.S. Cl.
USPC ............................ 382/305; 358/403; 707/821

(58) Field of Classification Search
USPC ...................... 382/305; 358/403, 404; 707/1
See application file for complete search history.

(56) References Cited

U.S. PATENT DOCUMENTS

| | | | |
|---|---|---|---|
| 4,992,947 A | 2/1991 | Nimura et al. | |
| 5,115,398 A | 5/1992 | De Jong | |
| 5,559,707 A | 9/1996 | DeLorme et al. | |
| 5,982,298 A | 11/1999 | Lappenbusch et al. | |
| 6,199,014 B1 | 3/2001 | Walker et al. | |
| 6,282,362 B1 | 8/2001 | Murphy et al. | |
| 7,050,102 B1 | 5/2006 | Vincent | |
| 2002/0054162 A1* | 5/2002 | Fujihara | 345/846 |
| 2004/0044894 A1* | 3/2004 | Lofgren et al. | 713/176 |
| 2006/0155761 A1* | 7/2006 | Van De Sluis et al. | 707/104.1 |
| 2006/0170693 A1* | 8/2006 | Bethune et al. | 345/568 |
| 2007/0055441 A1* | 3/2007 | Retterath et al. | 701/200 |
| 2009/0119305 A1* | 5/2009 | Johnson et al. | 707/10 |

OTHER PUBLICATIONS

Garmin StreetPilot c310 users manual.*
www.archive.org archived web page for maps.google.com on Feb. 8, 2005.*
www.archive.org archived web page for www.panoramio.com/help on Feb. 6, 2006.*
Wikipedia "Geotagging".*
Wikipedia "JPEG".*
TxFx.net "Flickr + Google Maps = Geobloggers", May 17, 2005.*
Robert Mohl, "Cognitive Space in the Interactive Movie Map: An Investigation of Spatial Learning in Virtual Environments", Massachusetts Institute of Technology, Department of Architecture, Feb. 1982, 232 pages.
Shenchang Eric Chen, "QuickTime® VR—An Image-Based Approach to Virtual Environment Navigation", ACM-0-89797-701-4/95/008, 1995, pp. 29-38.
Michitaka Hirose, "Image-Based Virtual World Generation", IEEE 1070-986X/97, Jan.-Mar. 1997, pp. 27-33.

* cited by examiner

*Primary Examiner* — Randolph I Chu
(74) *Attorney, Agent, or Firm* — Peter Taylor; Steven Spellman; Micky Minhas

(57) ABSTRACT

A unique system, method, and user interface are provided that facilitate more efficient indexing and retrieval of images. In particular, the systems and methods involve annotating or geo-coding images with their location metadata. Geo-coded images can be displayed on a map and browsed or queried based on their location metadata. Images can be annotated one by one or in bulk to reduce repetitiveness and inconsistency among related images. More specifically, selected images can be dropped onto a map, thereby triggering a virtual marker to appear. The virtual marker facilitates pinpointing the precise location associated with the images on the map with a higher level of granularity. The system and method can also generate customized directions and include geo-coded images throughout to serve as visual landmarks. Privacy controls can be employed as well to control access and modification of the images.

16 Claims, 13 Drawing Sheets

GEO-CODING IMAGES

BACKGROUND

Digital image technology has advanced exponentially in the recent years as is evident by higher consumer demands for higher quality digital cameras and digital image processing that is fast, convenient, and inexpensive. In fact, digital photography has become ubiquitous. However, due to the ease and frequency of taking and collecting digital images, substantial storage and indexing issues have arisen. For instance, it is not uncommon for individuals to amass thousands of digital images which are often stored in several disparate locations. Some may be stored on an office computer, some on a PDA, some on a mobile phone, some on a laptop, some on a home computer, and some online and in any of these, there may be many different folders, subfolders, and naming conventions used for various sets of images depending on when and where they were stored. Moreover, quick and efficient retrieval of particular images becomes an increasingly difficult problem especially as the number or type of digital media rises.

SUMMARY

The following presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

The subject application relates to systems, user interfaces, and/or methods that facilitate geo-based storage and retrieval of images. In particular, images can be annotated or geo-coded based on the geographic locations associated with their content. This can be accomplished in part by selecting one or more images to geo-code. The selected images can then be dragged and dropped onto a map, thus triggering a pointed marker such as a virtual push pin, flag, or thumbtack to appear. The marker can provide greater precision and accuracy when pinpointing the desired location. As the marker is moved on the map, corresponding locations can appear to assist the user in identifying them and in knowing where to place the marker. The map can be viewed at various zoom levels, and images can be geo-coded at any zoom level.

The geo-based annotation can be performed on individual images or can be done on a group of images in order to make the annotation efficient and consistent among related images. The annotated images can be displayed on a map view according to their respective locations and appear as icons. Once geo-coded, the images retain this information regardless of their storage location. A symbol or some other visualization can appear along with the image name to denote that it has been geo-coded. As desired, images can be retrieved from a database and viewed according to their location such as when searching or browsing through images. For example, images annotated with Corpus Christi, Tex. can be retrieved by entering a query for Corpus Christi, Tex. in a search field. The relevant images and/or their markers can appear on the map of Texas and point to Corpus Christi. Depending on the zoom level, the map view can show just the markers without any corresponding image icons, the image icons alone, or both the markers and the related image icons.

In addition, various navigation controls can be employed to facilitate viewing the images as they are arranged on the map. In particular, hovering over the image can cause a thumbnail view of the image (or at least a part of the image) to appear. Clicking on the thumbnail can expand the image to a full view. Hovering over the image can also reveal different types of information about the image such as the image name, date, location name, description of the location, and/or its coordinates.

Image sharing with family and friends and even the general public in some instances has become a more popular practice. Thus to manage the viewing of images, a privacy or security control can be employed to verify permission or access levels before allowing any one but to owner to access or view them. Furthermore, geo-coded images can be employed to assist with providing driving directions or to assist with telling a visual story using the geo-coded images and time stamps associated with each image.

To the accomplishment of the foregoing and related ends, certain illustrative aspects of the invention are described herein in connection with the following description and the annexed drawings. These aspects are indicative, however, of but a few of the various ways in which the principles of the invention may be employed and the subject invention is intended to include all such aspects and their equivalents. Other advantages and novel features of the invention may become apparent from the following detailed description of the invention when considered in conjunction with the drawings.

DETAILED DESCRIPTION

Figure 1:
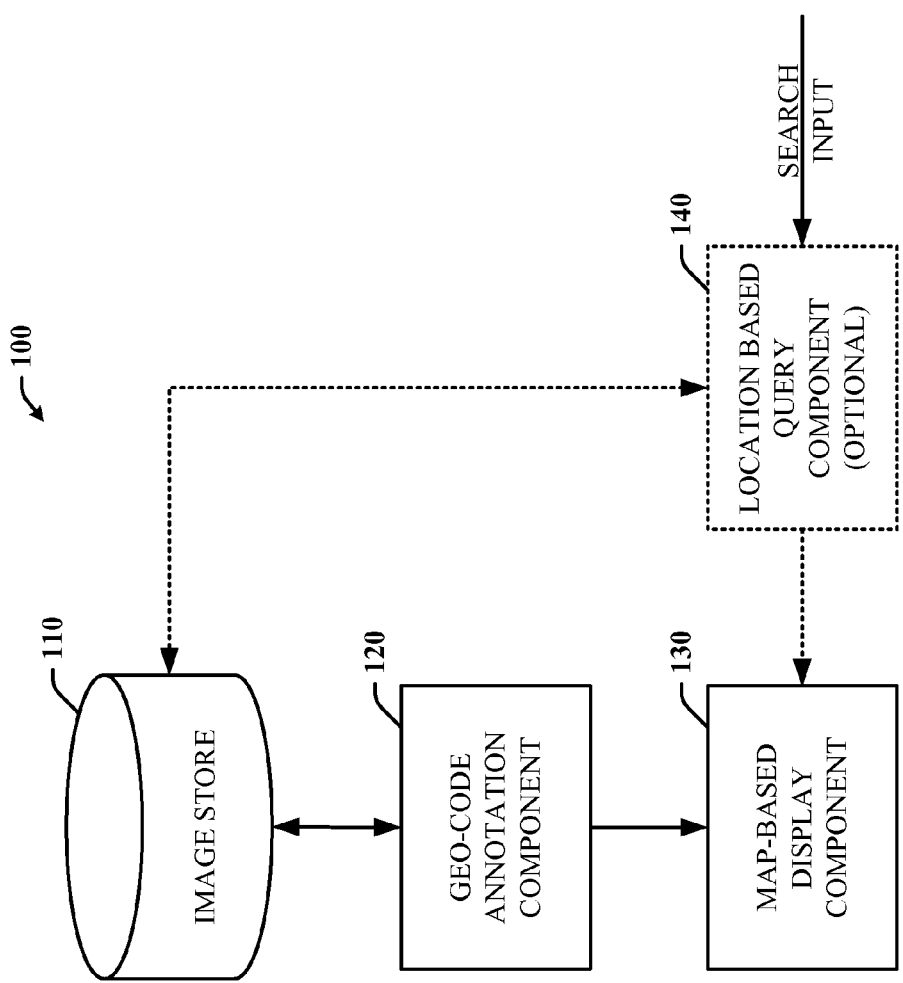
FIG. 1 is a block diagram of a system that facilitates geo-based storage and retrieval of images based on annotating the images with location data.

The subject systems and/or methods are now described with reference to the drawings, wherein like reference numerals are used to refer to like elements throughout. In the following description, for purposes of explanation, numerous specific details are set forth in order to provide a thorough understanding of the systems and/or methods. It may be evident, however, that the subject systems and/or methods may be practiced without these specific details. In other instances, well-known structures and devices are shown in block diagram form in order to facilitate describing them.

As used herein, the terms "component" and "system" are intended to refer to a computer-related entity, either hardware, a combination of hardware and software, software, or software in execution. For example, a component may be, but is not limited to being, a process running on a processor, a processor, an object, an executable, a thread of execution, a program, and a computer. By way of illustration, both an application running on a server and the server can be a component. One or more components may reside within a process and/or thread of execution and a component may be localized on one computer and/or distributed between two or more computers.

The subject application provides a unique system, method, and user interface that facilitate geo-annotating digital content to improve indexing, storing, and retrieval of such content. More specifically, the user interface includes a mechanism that allows users to drag and place digital content such as images or photographs onto specific locations on a map in order to be automatically geo-coded with that particular location information. Visualization cues can be employed as well to identify images that have been geo-coded or to assist in selecting a geo-code or location with a high level of granularity. The figures which follow below provide further details regarding various aspects of the subject systems, user interfaces, and methods.

Referring now to FIG. 1, there is a general block diagram of a system 100 that facilitates geo-based storage and retrieval of images based on annotating the images with location data. The system 100 includes an image store 110 that can accumulate and save a plurality of images for later viewing and/or modification (e.g., editing). The database may be located on a remote server or on a user's local machine. A geo-code annotation component 120 can annotate one or more images selected from the image store 110 with a respective geographic location associated with each image. The geo-coded images can then be viewed on a map by way of a map-based display component 130.

In practice, for example, imagine that a user has multiple sets of photos corresponding to his vacations over the last few years. In order to organize and store them more efficiently for easier viewing, the user can geo-code each set of photos one photo at a time or in groups. Suppose one set of photos were taken in Milan, Italy. The desired location can be found on the map using a few different approaches. In one approach, the user can enter Milan, Italy in a 'find' operation to quickly move the map to a view of Italy. Alternatively, the user can drag, pan, or scroll across the map until Italy is in view.

Once Italy is in view, the selected images corresponding to Milan can be dragged from the general photo view and onto the map. This can trigger a virtual marker which becomes associated or connected to these photos to appear on the map. The marker can lead the user to pinpoint the desired location. Once the correct location is found, a submit control can be clicked on which communicates the geo-code information for these photos back to the image store 110 for storage with the photos. Thus, these photos can forever be associated with and searchable by this particular location.

Subsequently, the geo-coded images stored in the image store 110 can be queried via a location-based query component 140. In particular, location based search input can be entered such as Milan, Italy. The query component 140 can search through the metadata maintained in the image store 110 for any matches to the search input. When a match is found, the corresponding image can be positioned on the map and viewed according to its location (e.g., Milan, Italy). Thus, when viewing a map of Italy, a cluster of markers can appear on top of or over Milan. Even more so, when viewing a map of Europe, there can be markers in Paris, France, and throughout Spain and Germany as well which indicate that there are other stored images related to those locations which also have been geo-coded.

Depending on the zoom view of the map, the markers can appear alone but when hovering there over, at least a partial view of the image can be viewed. As the map is zoomed in for more detail, an icon for each geo-coded image can appear along side its respective marker. When hovering over the marker, its final position as given by the user can be displayed as in the form of geolat: latitude and geolong: longitude. The actual name of the location including a street address if applicable can also be provided to the user.

Figure 2:
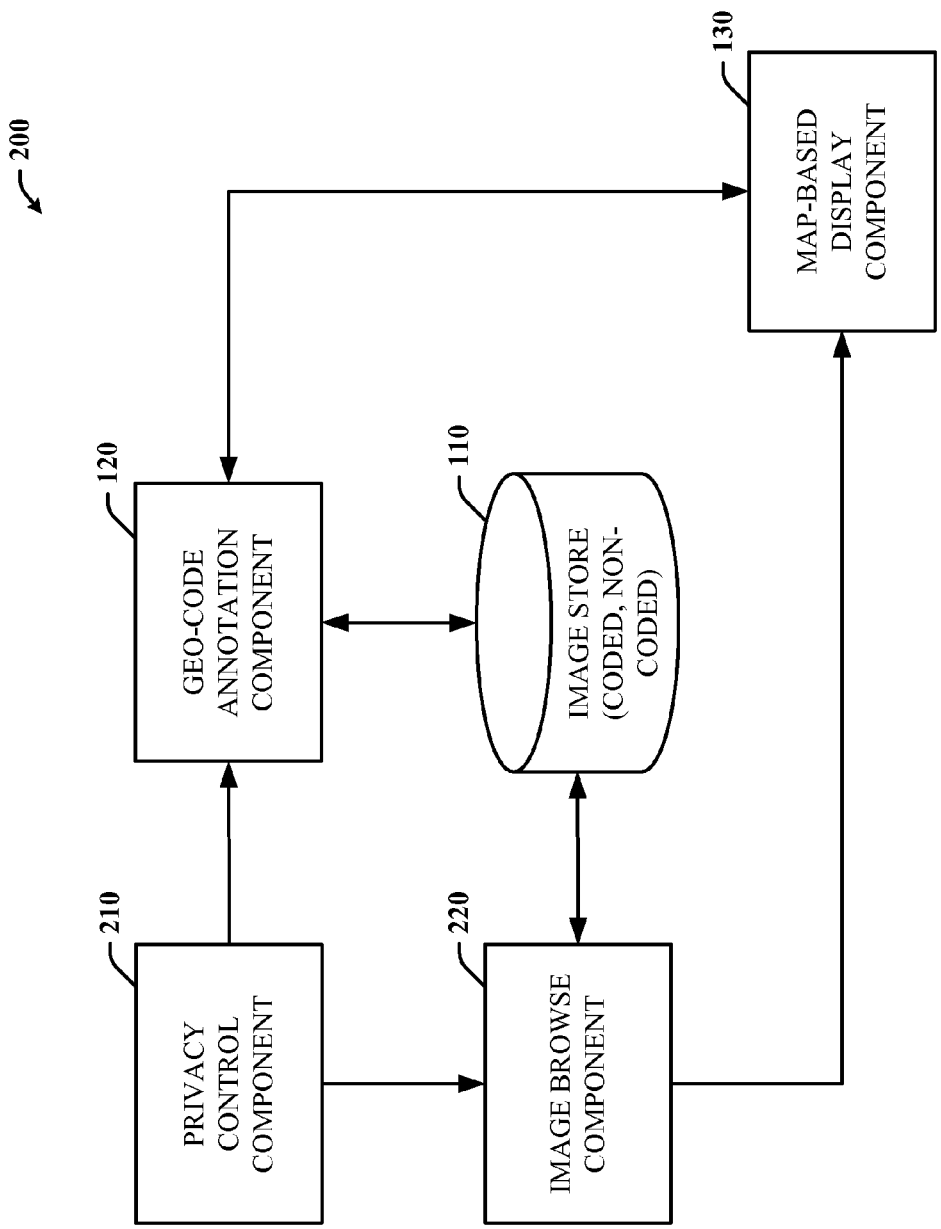
FIG. 2 is a block diagram of a system that facilitates geo-based storage and retrieval of images through browsing based on the location data associated with each image and on privacy controls.

Turning now to FIG. 2, there is a block diagram of a system 200 that facilitates indexing and retrieving geo-based images through browsing based on the location data associated with each image as well as privacy controls. The privacy controls manage the access, viewing, and editing of the images and in particular, the metadata, through the use of permissions. Examples of permission levels include but are not limited to access permission, viewing permission, and editing permission. For instance, some images can be viewed by the public whereas other images can be marked for private viewing only by the owner and/or other designated users.

As shown in FIG. 2, a privacy control component 210 can control an image browse component 220. The image browse component 220 can browse through the image store 110 by way of one or more maps displayed via the map-based display component 130. For instance, a map view of a user's geo-coded images can be viewable by any one with the requisite permissions. The geo-coded images can be presented in the map view for easier visibility and more relevant context. Take for example a group of pictures taken in London, England. A viewer of such pictures can readily understand the context of the pictures (e.g., London) without having to rely on the names of each picture. This can be helpful since digital images or photographs are often named automatically using a convention that is specific to the camera or camera-based device; and oftentimes, changing the names for dozens or hundreds of digital pictures can be an extremely slow and tedious process that many times is left undone. Therefore, by viewing a set of images by location, the viewer is provided with some additional information about the images.

The privacy control component 120 can also control the geo-code annotation component 120. In particular, edit permissions can be required in order to annotate any images with location metadata. However, when the user verifies permission such as by entering the correct login information, images from the image store can be geo-coded by the annotation component 120. The geo-code data can be stored along with the respective image, and the geo-coded images can be viewed on the map of the relevant region or area (e.g., particular country, state, city, street, continent, etc.).

Turning now to FIGS. 3-8, there are illustrated a series of exemplary user interfaces that can be employed by the system (100, 200) in order to facilitate the geo-coding of images for map-based viewing and browsing. Beginning with FIG. 3, the user interface 300 demonstrates an exemplary introductory screen that provides a user with an option of geo-coding images stored on a selected database or browsing those images. Security or privacy login data may be requested depending on which choice is selected and/or depending on whether any public or private data exists in the image store. Though this user interface names one image store from which to browse or access images, it should be appreciated that any available image store can be included here. Thus, if the user had images stored in multiple remote and/or local locations, they can all be listed on the user interface 300 in some relevant order. The user could select one image store to browse, view, or edit at a time. Alternatively, multiple image stores could be accessed at once particularly when some images belonging to the same location are stored in disparate locations.

Figure 3:
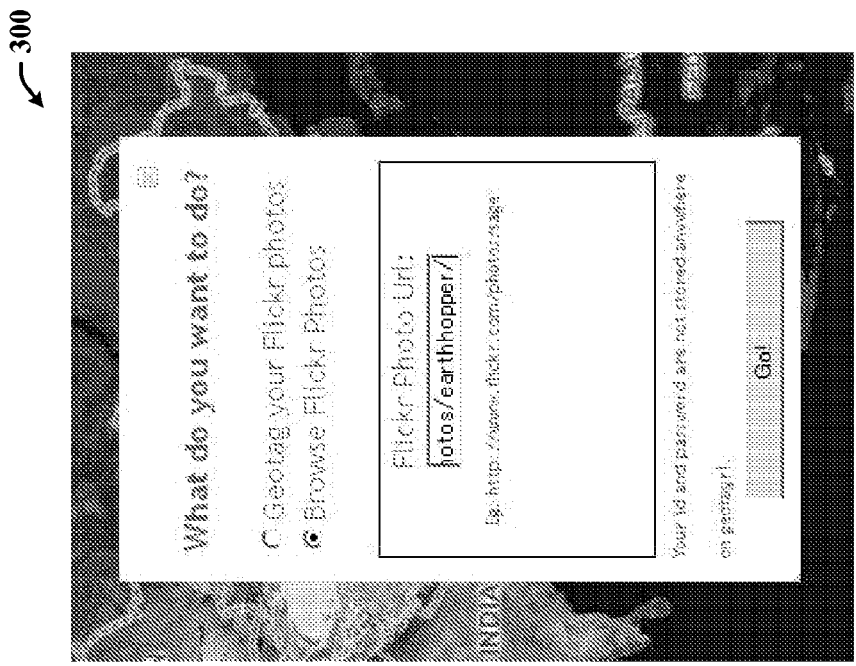
FIG. 3 is an exemplary user interface for a browser that facilitates accessing and retrieving stored images that may be employed in the systems of FIG. 1 and/or FIG. 2.
Figure 4:
FIG. 4 is an exemplary user interface for photo images that can be stored locally or remotely but retrieved and viewed for geo-based annotation.

FIG. 4 demonstrates an exemplary user interface for photo images that can be accessed and viewed once the relevant image store is selected in FIG. 3. Groups of photos can be represented as a photo set. The user can select one or more photo sets to expose the individual images in the Photos screen. Any photo image can then be dragged and dropped on to the map to be geo-coded. For example, suppose a user has a set of photos from various locations within San Francisco. Some were taken from the Golden Gate Bridge, Ghirardelli Square, a trolley, Lombard Street, and Chinatown. The user can drag one or more of these images to the map and then pin point them using a virtual push pin or marker to San Francisco or the relevant location on the map. Depending on the zoom view of the map, the user can also pin point any image to a street or address as well.

Again, the zoom view of the map can dictate the type of information readily visible on the map. For example, on one zoom level, the virtual markers may only be visible. To view the corresponding image and its related location and image information, the user can hover on the marker. Alternatively, both the marker and image can be readily visible. The marker itself can stem out from a top edge of the image as demonstrated in FIG. 5. In another view, only the images may be visible as icons without the markers. In this latter case, the marker can appear when hovering over the image icon and other related image information can be shown as well.

Figure 5:
FIG. 5 is an exemplary user interface demonstrating a plurality of photos available for geo-code annotation as well as images on the map that previously have been geo-coded.

According to FIG. 5, there is a plurality of photo images 510 in view by the user. One of the images named Eisa 520 has just been geo-coded on a location in Japan. The image above Eisa in the Photos list (530) has previously been geo-coded as indicated by the symbol 540 (e.g., globe) next to the image name.

The map view can be panned to various locations by manually scrolling, panning, and zooming to find a desired location. Alternatively, a find location operation can be performed. For example, if the user now wants to find San Francisco (after geo-coding images in Japan), rather than manually navigate the map to that location, he can enter the location in a designated field and the map view can change to show California and in particular, San Francisco. That is, the center or focal point of the map view can change as needed.

Figure 6:
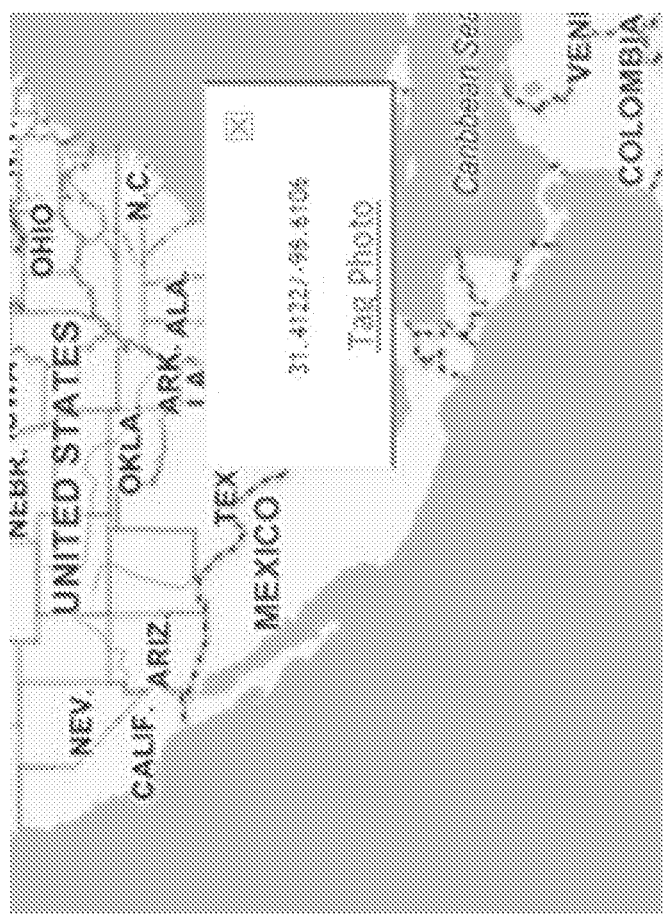
FIG. 6 is an exemplary user interface of a map view that results from right clicking on any point on the map which can be employed to geo-code one or more images.
Figure 7:
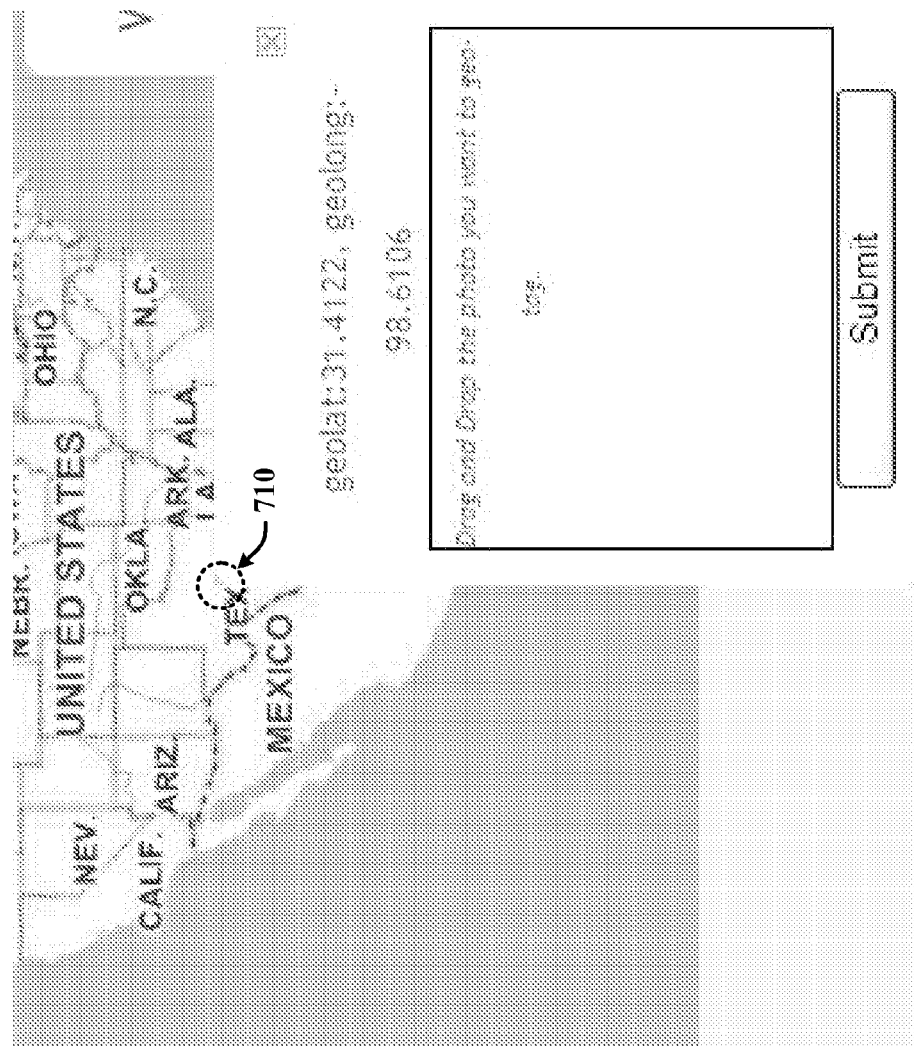
FIG. 7 is an exemplary user interface of the map view that follows from FIG. 6 where "tag photo" is selected and triggers a box to open for geo-coding one or more images.

Yet another option is demonstrated in FIGS. 6 and 7. Here, the user can select any point on the map by right-clicking on that point. A set of coordinates can be visualized that correspond to that point as illustrated in FIG. 6. In addition, the actual location such as street or city and state can be identified here as well though not included in the figure. At this time, the user can select tag photo to geo-code any images with these coordinates. Selecting tag photo can trigger another window to open as depicted in FIG. 7 that allows the user to drag and drop several images into the window for geo-coding with the same coordinates (31.4122, 98.6106). The window in FIG. 7 appears to be large but the top right hand corner 710 (circled in black) indicates the precise point on the map that the geo-code relates to. Any images dropped into the window can be geo-coded with these coordinates after the submit button is selected.

Figure 8:
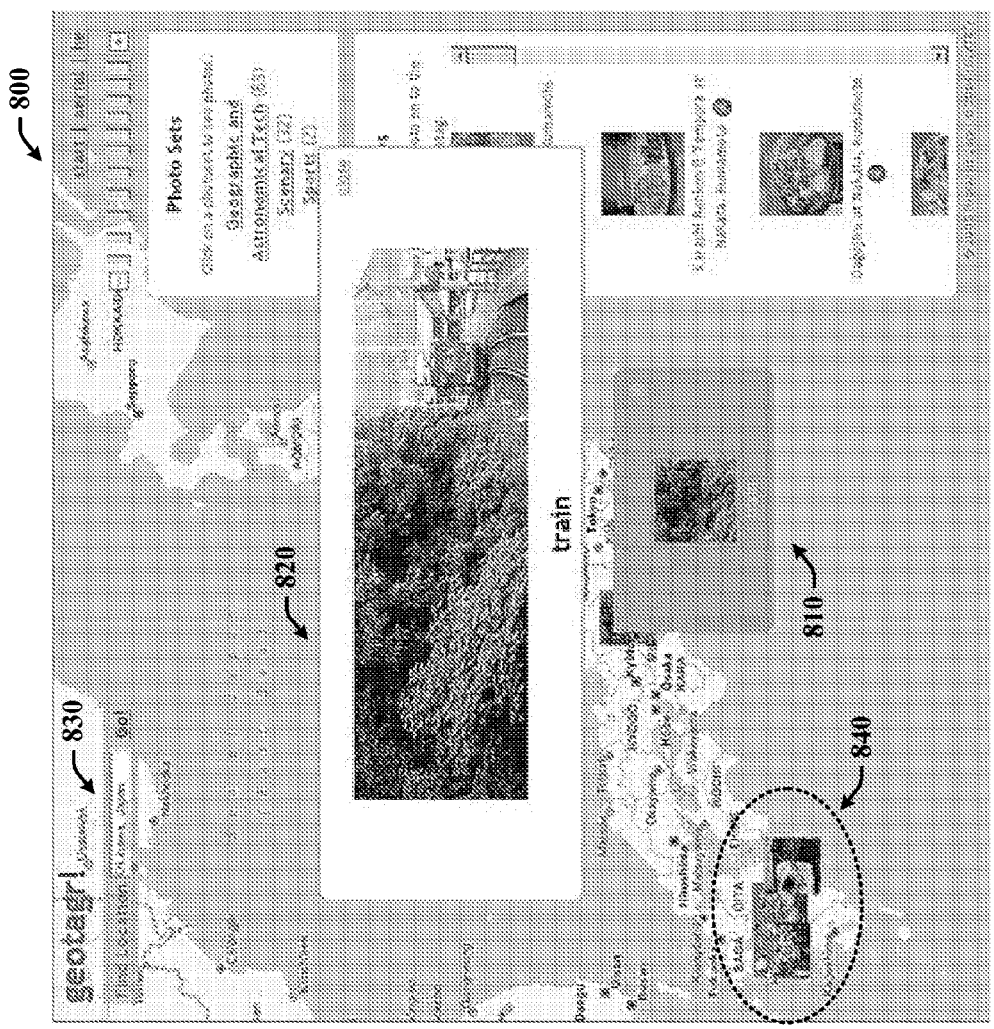
FIG. 8 is an exemplary user interface that demonstrates a hover operation performed on an image marker and an expansion of a thumbnail view to a full view of an image.

Moving on to FIG. 8, there is an exemplary user interface 800 that demonstrates a hover operation performed on an image marker and an expansion of a thumbnail view 810 to a full view of an image 820. As indicated in the figure, the user has entered Okinawa, Japan in the Find field 830, and thus the current map view is of Japan. In the southern end of Japan, there are a number if image icons 840 (circled in black for emphasis) on the map. A thumbnail view of an image can be obtained by clicking or right clicking on the respective image icon. The thumbnail view can be further expanded to the full size view of the image by clicking on the thumbnail. It should be appreciated that the thumbnail can be a partial image of the real image—contrary to the partial image shown in the thumbnail view.

Figure 9:
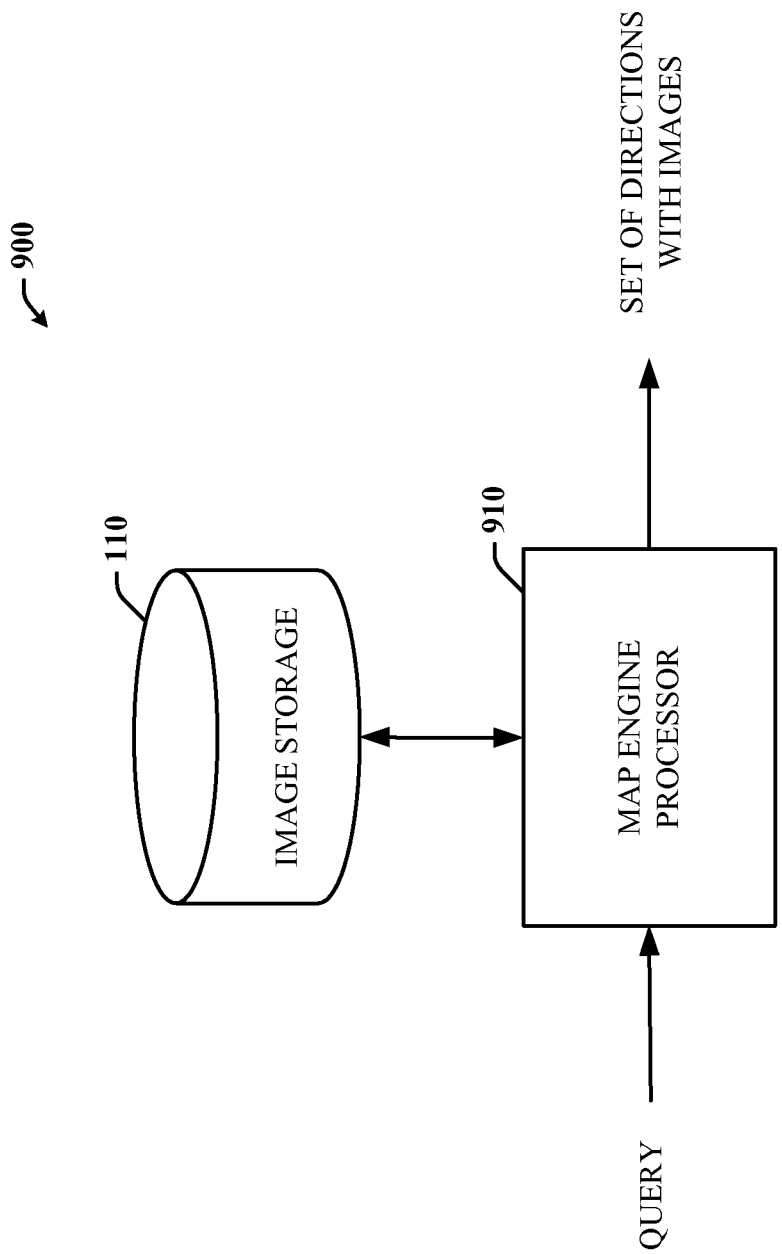
FIG. 9 is a block diagram of a system that facilitates generating map related directions and including one or more geo-coded images where appropriate to serve as landmarks.

Turning now to FIG. 9, there is a block diagram of a system 900 that facilitates generating map related directions and including one or more geo-coded images where appropriate to serve as landmarks. The system 900 includes the image store 110 comprising geo-coded images and a map engine processor 910. The map engine processor 910 can process a query such as for driving directions based in part on the geo-coded images in the image store 110. For example, people often can follow directions better when physical landmarks are provided together with or in the absence of street names. In this case, the map engine processor 910 can retrieve the most relevant geo-coded images to include in a set of customized driving directions. In practice, for instance, the directions can include the following: Turn right on Main Street—a large giraffe statue is on the corner. A picture of the large giraffe statue can accompany this line in or this portion of the directions and be viewable by the user.

Though not depicted in the figures, geo-coded images can also facilitate the creation of stories or summaries of a particular trip or experience as captured in the images. For instance, imagine that a user has a set of pictures from Washington, D.C. and he wants to share his pictures and his trip with his friends who have never been there. By geo-coding the pictures and ordering them by time taken, the user can create a story of his trip and the sights and tourist attractions he visited can be viewed as he experienced them. Thus, he could walk his friends through his trip by way of his geo-coded pictures.

Various methodologies will now be described via a series of acts. It is to be understood and appreciated that the subject system and/or methodology is not limited by the order of acts, as some acts may, in accordance with the subject application, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the subject application.

Figure 10:
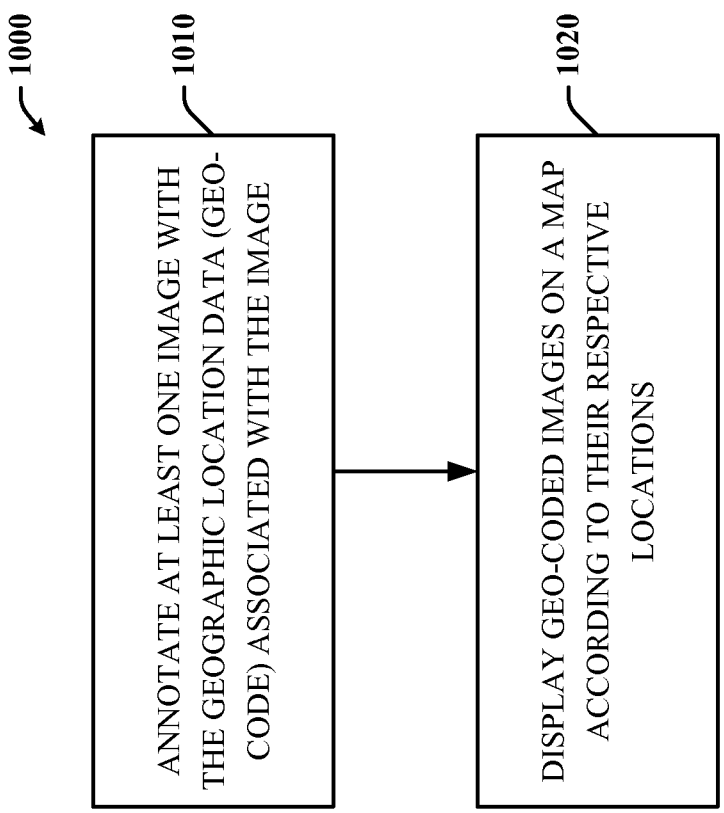
FIG. 10 is a flow diagram of an exemplary method that facilitates geo-based storage and retrieval of images based on annotating the images with location data.

Referring now to FIG. 10, there is a flow diagram of an exemplary method 1000 that facilitates geo-based storage and retrieval of images based on annotating the images with their associated location data. The method 1000 involves annotating at least one image with the geographic location data or geo-code associated therewith at 1010. One or more images can be selected from an image store to be annotated individually (one by one) or in bulk to mitigate tedious and repetitive actions. The location data refers to the location that is associated with each image. For example, photos taken at the Fort Worth Stockyards can be associated with Fort Worth, Tex. Alternatively, a specific street name or address can be associated with the image and the image can be annotated accordingly.

At 1020, the geo-coded images can be displayed on a map according to their respective locations (and geo-codes). For example, the images can be displayed as icons that can be clicked on to open the image or view its information. The geo-codes and maps can be based on any coordinate system such as latitude, longitude coordinates. Additional information about each image can be obtained by hovering over the image, by right clicking to view a number of different options, or by clicking on it to expand the view of the image.

Figure 11:
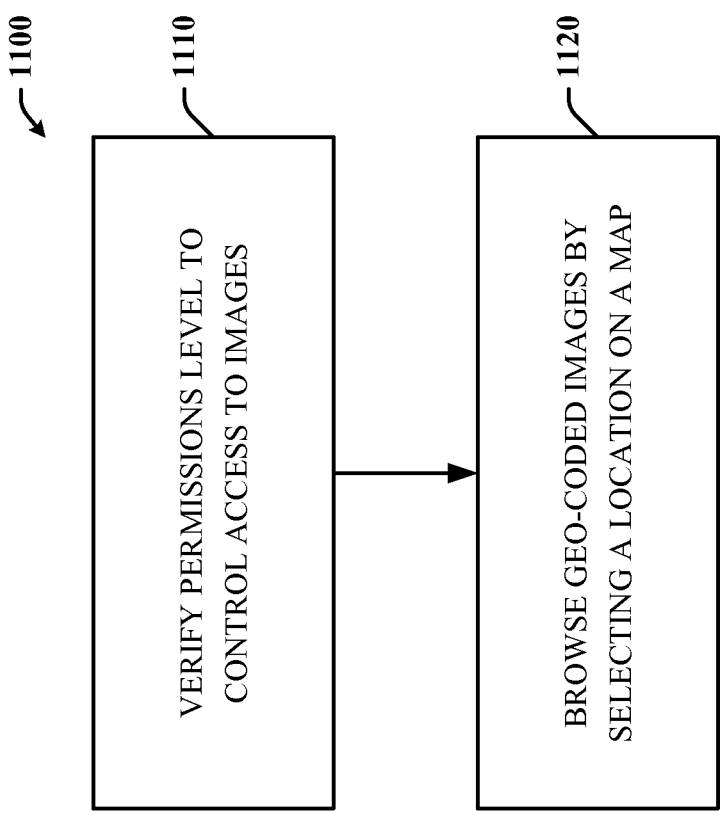
FIG. 11 is a flow diagram of an exemplary method that facilitates storing and browsing images by location given the requisite permission levels to do so.

Turning now to FIG. 11, there is a flow diagram of an exemplary method that facilitates storing and browsing images by location given the requisite permission levels to do so. In particular, the method 1100 involves verifying a permissions level at 1110 in order to control access to any images including geo-coded and non-geo-coded images. Thus, at a minimum, users can be asked to provide login information in order to freely access, view, and/or edit their images in order to mitigate the unauthorized acts of others. At 1120, geo-coded images can be browsed and/or viewed by selecting or entering a location on a map. Any images can be made public or be kept private depending on user preferences. However, certain actions can be controlled by verifying the permissions level(s) of each user or viewer.

Figure 12:
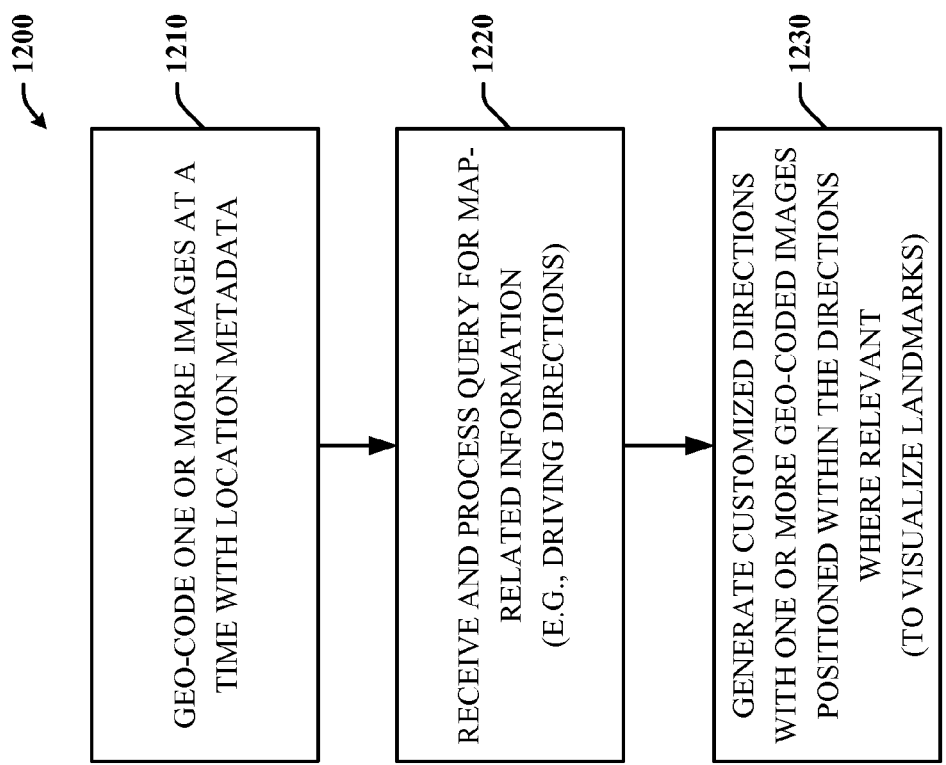
FIG. 12 is a flow diagram of a method that facilitates generating customized directions which incorporate one or more geo-coded images where appropriate for use as landmarks.

In FIG. 12, there is a flow diagram of an exemplary method 1200 that facilitates generating customized directions which incorporate one or more geo-coded images where appropriate for use as landmarks. The method 1200 involves geo-coding one or more images with location metadata associated with each image at 1210. Images with the same location metadata can be geo-coded at the same time to make the process more efficient. At 1220, a query for map-related information such as driving directions can be received and processed. At 1230, a customized set of directions can be generated whereby one or more geo-coded images are included and positioned within the directions to operate as visualized landmarks. Thus, geo-coded images can be viewed in the directions to make it easier for the user to find his way. For some users, this can be very helpful since they are no longer required to only rely on street names. Instead, they can be able to view landmarks or buildings along their route.

Figure 13:
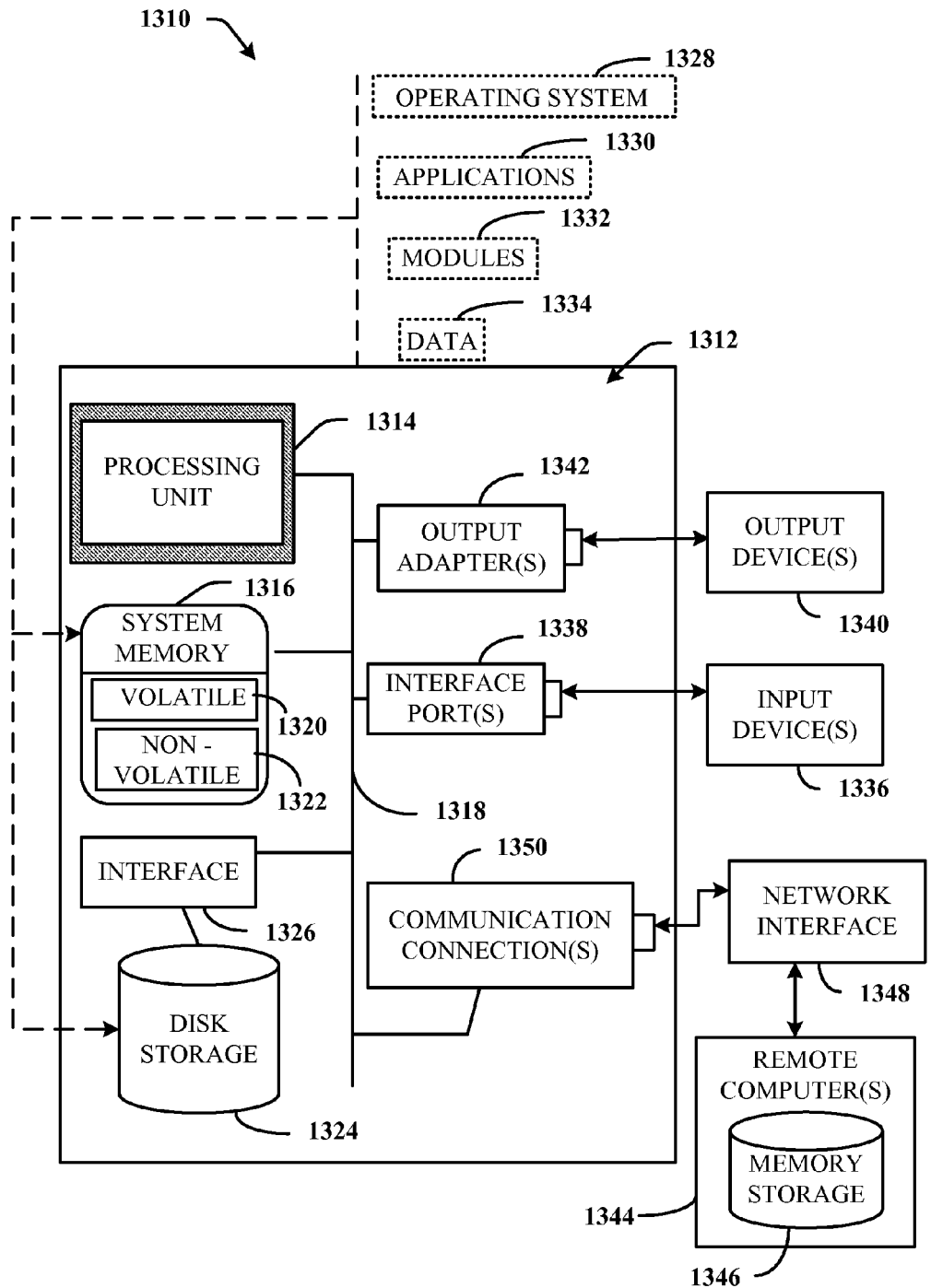
FIG. 13 illustrates an exemplary environment for implementing various aspects of the invention.

In order to provide additional context for various aspects of the subject mapping system and method, FIG. 13 and the following discussion are intended to provide a brief, general description of a suitable operating environment 1310 in which various aspects of the mapping system and method may be implemented. The subject system and method can operate on any computing device—portable or non-portable including but not limited to desktop computers, laptops, PDAs, smart phones, mobile phones, and tablet PCs on which the social network can be accessed and viewed. While the invention is described in the general context of computer-executable instructions, such as program modules, executed by one or more computers or other devices, those skilled in the art will recognize that the invention can also be implemented in combination with other program modules and/or as a combination of hardware and software.

Generally, however, program modules include routines, programs, objects, components, data structures, etc. that perform particular tasks or implement particular data types. The operating environment 1310 is only one example of a suitable operating environment and is not intended to suggest any limitation as to the scope of use or functionality of the invention. Other well known computer systems, environments, and/or configurations that may be suitable for use with the invention include but are not limited to, personal computers, hand-held or laptop devices, multiprocessor systems, microprocessor-based systems, programmable consumer electronics, network PCs, minicomputers, mainframe computers, distributed computing environments that include the above systems or devices, and the like.

With reference to FIG. 13, an exemplary environment 1310 for implementing various aspects of the invention includes a computer 1312. The computer 1312 includes a processing unit 1314, a system memory 1316, and a system bus 1318. The system bus 1318 couples system components including, but not limited to, the system memory 1316 to the processing unit 1314. The processing unit 1314 can be any of various available processors. Dual microprocessors and other multiprocessor architectures also can be employed as the processing unit 1314.

The system bus 1318 can be any of several types of bus structure(s) including the memory bus or memory controller, a peripheral bus or external bus, and/or a local bus using any variety of available bus architectures including, but not limited to, 11-bit bus, Industrial Standard Architecture (ISA), Micro-Channel Architecture (MCA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 1316 includes volatile memory 1320 and nonvolatile memory 1322. The basic input/output system (BIOS), containing the basic routines to transfer information between elements within the computer 1312, such as during start-up, is stored in nonvolatile memory 1322. By way of illustration, and not limitation, nonvolatile memory 1322 can include read only memory (ROM), programmable ROM (PROM), electrically programmable ROM (EPROM), electrically erasable ROM (EEPROM), or flash memory. Volatile memory 1320 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1312 also includes removable/nonremovable, volatile/nonvolatile computer storage media. FIG. 13 illustrates, for example a disk storage 1324. Disk storage 1324 includes, but is not limited to, devices like a magnetic disk drive, floppy disk drive, tape drive, Jaz drive, Zip drive, LS-100 drive, flash memory card, or memory stick. In addition, disk storage 1324 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1324 to the system bus 1318, a removable or non-removable interface is typically used such as interface 1326.

It is to be appreciated that FIG. 13 describes software that acts as an intermediary between users and the basic computer resources described in suitable operating environment 1310. Such software includes an operating system 1328. Operating system 1328, which can be stored on disk storage 1324, acts to control and allocate resources of the computer system 1312. System applications 1330 take advantage of the management of resources by operating system 1328 through program modules 1332 and program data 1334 stored either in system memory 1316 or on disk storage 1324. It is to be appreciated that the subject invention can be implemented with various operating systems or combinations of operating systems.

A user enters commands or information into the computer 1312 through input device(s) 1336. Input devices 1336 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1314 through the system bus 1318 via interface port(s) 1338. Interface port(s) 1338 include, for example, a serial port, a parallel port, a game port, and a universal serial bus (USB). Output device(s) 1340 use some of the same type of ports as input device(s) 1336. Thus, for example, a USB port may be used to provide input to computer 1312 and to output information from computer 1312 to an output device 1340. Output adapter 1342 is provided to illustrate that there are some output devices 1340 like monitors, speakers, and printers among other output devices 1340 that require special adapters. The output adapters 1342 include, by way of illustration and not limitation, video and sound cards that provide a means of connection between the output device 1340 and the system bus 1318. It should be noted that other devices and/or systems of devices provide both input and output capabilities such as remote computer(s) 1344.

Computer 1312 can operate in a networked environment using logical connections to one or more remote computers, such as remote computer(s) 1344. The remote computer(s) 1344 can be a personal computer, a server, a router, a network PC, a workstation, a microprocessor based appliance, a peer device or other common network node and the like, and typically includes many or all of the elements described relative to computer 1312. For purposes of brevity, only a memory storage device 1346 is illustrated with remote computer(s) 1344. Remote computer(s) 1344 is logically connected to computer 1312 through a network interface 1348 and then physically connected via communication connection 1350. Network interface 1348 encompasses communication networks such as local-area networks (LAN) and wide-area networks (WAN). LAN technologies include Fiber Distributed Data Interface (FDDI), Copper Distributed Data Interface (CDDI), Ethernet/IEEE 1102.3, Token Ring/IEEE 1102.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1350 refers to the hardware/software employed to connect the network interface 1348 to the bus 1318. While communication connection 1350 is shown for illustrative clarity inside computer 1312, it can also be external to computer 1312. The hardware/software necessary for connection to the network interface 1348 includes, for exemplary purposes only, internal and external technologies such as, modems including regular telephone grade modems, cable modems and DSL modems, ISDN adapters, and Ethernet cards.

What has been described above includes examples of the subject system and/or method. It is, of course, not possible to describe every conceivable combination of components or methodologies for purposes of describing the subject system and/or method, but one of ordinary skill in the art may recognize that many further combinations and permutations of the subject system and/or method are possible. Accordingly, the subject system and/or method are intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. One or more computer-storage memory having computer-executable instructions embodied thereon for storing a system that facilitates geo-based storage and retrieval of images, the system comprising:
   a geo-code annotation component that annotates at least one image together with geographic location metadata to create at least one geo-coded image after the at least one image has been dragged and dropped onto a map from a photo sharing application, and transmits the at least one geo-coded image for storage in an image store, wherein dropping the at least one image onto the map triggers the appearance of a marker that, before annotation, is moveable to any location on the map, and wherein the geographic location metadata correspond to the location of the marker at the time of annotation; and
   a map-based display component that displays:
   (1) the marker associated with each of the at least one geo-coded image, the marker being indicative of the location associated with the respective at least one geo-coded image, and
   (2) the at least one geo-coded image or at least one image icon representative of the at least one geo-coded image on the map at a position indicative of a location corresponding to the geographic location metadata associated with the at least one geo-coded image, wherein a display of the marker, a geo-coded image or image icon, or both, is based on a zoom view of the map.

2. The computer-storage memory of claim 1, wherein the geographic location metadata comprises coordinates corresponding to the location associated with the at least one geo-coded image.

3. The computer-storage memory of claim 1, wherein the image store stores images and geo-coded images.

4. The computer-storage memory of claim 1, wherein the system further comprises a location-based query component that searches through the image store to find at least one match to the location-based search input based on the geographic location metadata stored therein, wherein the location-based search input is a geographic place name.

5. The computer-storage memory of claim 4, wherein the map-based display component displays any matches to the location-based search input according to their respective locations on the map.

6. The computer-storage memory of claim 1, wherein the system further comprises a privacy control component that controls at least one of access, view, and modification of any stored images by verifying permission levels.

7. The computer-storage memory of claim 1, wherein the system further comprises a map engine processor that generates a customized set of directions comprising one or more geo-coded images, wherein the one or more geo-coded images represent landmarks along a route provided in the directions.

8. One or more computer-storage memory storing computer-executable instructions for performing a method that facilitates geo-based storage and retrieval of images, the method comprising:

receiving a user selection of one or more images or groups of images in a photo sharing application;

receiving a user request to drag and drop the one or more images or groups of images onto a map;

in response to the user request, transmitting an instruction to display a marker corresponding to each image or group of images, the markers being moveable to any location on the map until the images or groups of images are annotated;

after the user has moved at least one marker, annotating the image or group of images corresponding to the at least one marker with geographic location metadata to create a geo-coded image or group of geo-coded images, wherein the geographic location metadata represent the location of the corresponding marker at the time of annotation;

storing the image or group of images together with the geographic location metadata in an image store; and transmitting instructions to display the at least one geo-coded image or group of geo-coded images or at least one image icon representative of the at least one geo-coded image or group of geo-coded images on the map at a position indicative of a respective location corresponding to the geographic location metadata associated with the at least one geo-coded image or group of geo-coded images, wherein a display of the marker, a geo-coded image or image icon, or both, is based on a zoom view of the map.

9. The computer-storage memory of claim 8, wherein the images or groups of images included in the user selection are located in an image store.

10. The computer-storage memory of claim 8, further comprising verifying a permission level before providing access, editing, or viewing rights to any stored images.

11. The computer-storage memory of claim 8, wherein the displayed at least one geo-coded image or group of geo-coded images are part of customized content.

12. The computer-storage memory of claim 11, wherein the customized content is a story of a trip to an area that includes the location represented by the geographic location metadata of the at least one geo-coded image or group of geo-coded images.

13. The computer-storage memory of claim 11, wherein the customized content is driving directions.

14. The computer-storage memory of claim 1, wherein the one or more geo-coded images on the map are displayed as part of a story of a trip to an area that includes the location represented by the geographic location metadata of the one or more geo-coded images.

15. The computer storage memory of claim 1, wherein the marker comprises one of a virtual pushpin, flag, or thumbtack.

16. The computer storage memory of claim 8, wherein the marker comprises one of a virtual pushpin, flag, or thumbtack.

* * * * *